(12) United States Patent
Twelves et al.

(10) Patent No.: US 9,290,261 B2
(45) Date of Patent: Mar. 22, 2016

(54) METHOD AND ASSEMBLY FOR ATTACHING COMPONENTS

(75) Inventors: Wendell V. Twelves, Glastonbury, CT (US); Kathleen E. Sinnamon, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 991 days.

(21) Appl. No.: 13/157,284

(22) Filed: Jun. 9, 2011

(65) Prior Publication Data

US 2012/0311841 A1 Dec. 13, 2012

(51) Int. Cl.
  *F16B 1/00* (2006.01)
  *B64C 9/02* (2006.01)
  *F16B 5/02* (2006.01)

(52) U.S. Cl.
  CPC .............. *B64C 9/02* (2013.01); *F16B 5/0241* (2013.01); *Y10T 29/49826* (2015.01); *Y10T 403/21* (2015.01); *Y10T 403/217* (2015.01)

(58) Field of Classification Search
  CPC .................. F16B 5/0241; B64C 9/02
  USPC ........ 74/60, 469, 519, 522, 524, 525, 473.11; 244/99.3, 131, 158.1; 403/30, 66, 72, 403/79, 28; 29/428, 447
  See application file for complete search history.

(56) References Cited

U.S. PATENT DOCUMENTS

| | | | |
|---|---|---|---|
| 1,596,856 A | 8/1926 | Setlow | |
| 3,016,746 A * | 1/1962 | Holloway | 374/110 |
| 3,070,953 A * | 1/1963 | Carrel | 60/529 |
| 3,675,376 A * | 7/1972 | Belew | 52/1 |
| 4,243,189 A * | 1/1981 | Ohgi | 244/99.3 |
| 4,243,192 A | 1/1981 | Johnson | |
| 4,312,599 A | 1/1982 | Darolia | |
| 4,411,954 A | 10/1983 | Butch, III et al. | |
| 4,450,687 A * | 5/1984 | Cole | 60/530 |
| 4,556,591 A | 12/1985 | Bannink, Jr. | |
| 4,689,928 A | 9/1987 | Dutton et al. | |
| 4,834,569 A | 5/1989 | Foote et al. | |
| 4,861,229 A | 8/1989 | Halstead | |
| 4,863,122 A * | 9/1989 | Bolang et al. | 244/221 |
| 5,015,116 A | 5/1991 | Nardone et al. | |
| 5,228,795 A | 7/1993 | Gray | |
| 6,012,610 A | 1/2000 | Pauser et al. | |
| 6,102,610 A | 8/2000 | Palusis et al. | |
| 6,679,062 B2 | 1/2004 | Conete et al. | |
| 6,758,653 B2 | 7/2004 | Morrison | |
| 6,895,761 B2 | 5/2005 | Mitchell et al. | |

(Continued)

FOREIGN PATENT DOCUMENTS

EP 1152156 A1 11/2001

*Primary Examiner* — David Bryant
*Assistant Examiner* — Steven A Maynard
(74) *Attorney, Agent, or Firm* — Carlson, Gaskey & Olds, P.C.

(57) ABSTRACT

An example adjustable linking member of a mounting assembly includes a first attachment portion and a second attachment portion. The first attachment portion connects a linking member to a first component. The second attachment portion connects the linking member to a second component. A variable portion of the adjustable linking member varies a distance between the first attachment portion and the second attachment portion in a first direction when heated. The variable portion varies the distance between the first attachment portion and the second attachment portion in a second direction when cooled. The first direction is opposite the second direction.

20 Claims, 4 Drawing Sheets

(56) References Cited

U.S. PATENT DOCUMENTS

| | | |
|---|---|---|
| 6,910,853 B2 | 6/2005 | Corman et al. |
| 7,416,362 B2 | 8/2008 | North |
| 7,647,779 B2 | 1/2010 | Shi et al. |
| 7,878,459 B2 * | 2/2011 | Mabe et al. .................. 244/213 |
| 8,556,531 B1 | 10/2013 | Bird et al. |
| 2002/0100840 A1 * | 8/2002 | Billinger et al. ............. 244/131 |
| 2009/0028697 A1 | 1/2009 | Shi et al. |
| 2009/0035406 A1 | 2/2009 | Cleary, Jr. et al. |
| 2009/0212158 A1 * | 8/2009 | Mabe et al. .................. 244/1 N |
| 2009/0272122 A1 | 11/2009 | Shi et al. |
| 2010/0019096 A1 * | 1/2010 | Pecora et al. ................ 244/213 |
| 2010/0104433 A1 | 4/2010 | Shi et al. |
| 2010/0227698 A1 | 9/2010 | Keith et al. |
| 2010/0257864 A1 | 10/2010 | Prociw et al. |

\* cited by examiner

METHOD AND ASSEMBLY FOR ATTACHING COMPONENTS

BACKGROUND

This disclosure relates generally to securing components and, more particularly, to securing components that have different coefficients of thermal expansion.

As known, components having different coefficients of thermal expansion will expand and contract at different rates in response to temperature fluctuations. Securing components having different coefficients of thermal expansion is often difficult because the attachment strategy must accommodate the different rates of expansion and contraction.

The high temperature environment of an aircraft includes many components having different coefficients of thermal expansion. These components often need to be secured to each other. For example, some aircraft include a trailing edge assembly that is secured to a metallic airframe bracket. The trailing edge assembly is typically made of a ceramic matrix composite material, which has a lower coefficient of thermal expansion than the, typically metallic, airframe bracket. As can be appreciated, securing such a trailing edge assembly to the airframe bracket is difficult due, in part, to the growth and retraction of the trailing edge assembly relative to the airframe brackets.

The different rates of expansion and contraction between the trailing edge assembly and the airframe brackets have been accommodated by introducing slotted holes and flexures into the attachment strategy. These features offer limited positional precision, limited vibration resistance, and may not provide a rigid attachment.

SUMMARY

An example adjustable linking member of a mounting assembly includes a first attachment portion and a second attachment portion. The first attachment portion connects a linking member to a first component. The second attachment portion connects the linking member to a second component. A variable portion of the adjustable linking member varies a distance between the first attachment portion and the second attachment portion in a first direction when heated. The variable portion varies the distance between the first attachment portion and the second attachment portion in a second direction when cooled. The first direction is opposite the second direction.

An example adjustable mounting assembly includes a linking member that has a first end secured to a first component of an aircraft and an opposing, second end secured to a second component of the aircraft. The first component has a first coefficient of thermal expansion, and the second component has a second coefficient of thermal expansion that is different than the first coefficient of thermal expansion. A variable portion of the linking member is configured to vary a length of the linking member in a first direction when heated and to vary the length of the linking member in a second direction when cooled. The first direction is opposite the second direction.

An example method of adjustably mounting a first component to a second component having a different coefficient of thermal expansion than the first component includes securing the components together with a linking member. The method selectively adjusts the temperature of a variable portion of the linking member to change the size of the linking member.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
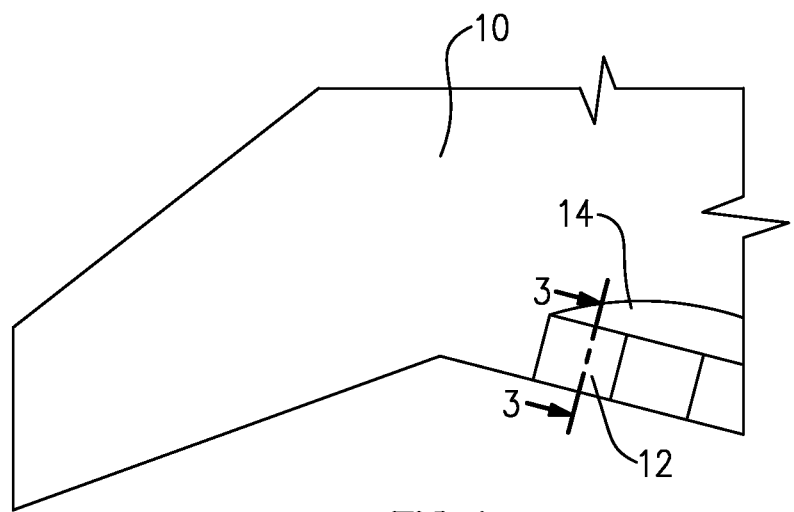
FIG. 1 shows a perspective view of a trailing edge assembly of an aircraft.

Referring to FIGS. 1-4, in this example, an aircraft 10 includes a first component and a second component. The first component is a trailing edge assembly 12. The second component is an airframe structure 14.

The example trailing edge assembly 12 includes an outer shell 16 and ribs 18 spanning opposing walls of the outer shell 16. A mounting assembly 20 is secured to the ribs 18 to connect the trailing edge assembly 12 to the airframe structure 14. In this example, the mounting assembly 20 includes a plurality of linking members 22. Each of the linking members 22 extends between a first attachment portion 24 and a second attachment portion 26. The first attachment portion 24 is secured to the ribs 18, and the second attachment portion 26 is secured to the mounting assembly 20.

The first attachment portions 24 of the example linking members 22 are secured directly to the ribs 18 with fasteners 32. The second attachment portions 26 of the linking members 22 are secured to a bracket 28 with fasteners 30, which is fastened directly to the airframe structure 14 with a plurality of fasteners 31. In another example, the second attachment portions 26 are secured directly to the airframe structure 14 with the fasteners 30.

The trailing edge assembly 12 and the airframe structure 14 have different coefficients of thermal expansion. Thus, as the trailing edge assembly 12 and the airframe structure 14 are heated, the trailing edge assembly 12 changes length at a different rate than the airframe structure 14. In one example, the trailing edge assembly 12 is a ceramic matrix composite component, and the airframe structure 14 is a metallic material.

The adjustable linking members 22 of the mounting assembly 20 accommodate the different rates of thermal expansion and contraction. Accommodating these differences limits contact between the trailing edge assembly 12 and the airframe structure 14 particularly at interfaces between the two components such as the interfaces 34. Undesirable contact can damage the trailing edge assembly 12, for example. Accommodating these differences also controls the size of gaps at the interfaces 34.

Figure 2:
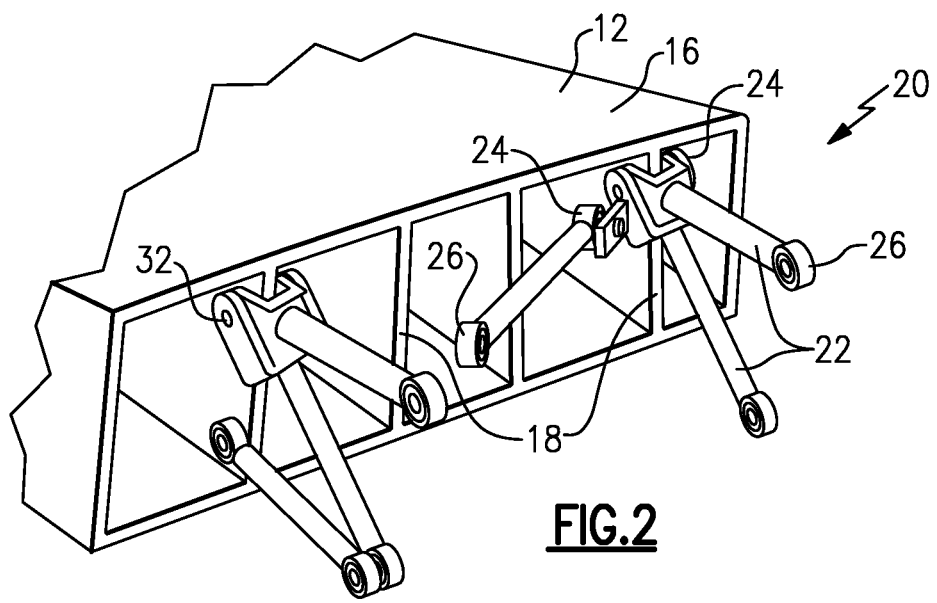
FIG. 2 shows an end view of the FIG. 1 trailing edge structure and a mounting assembly.
Figure 3:
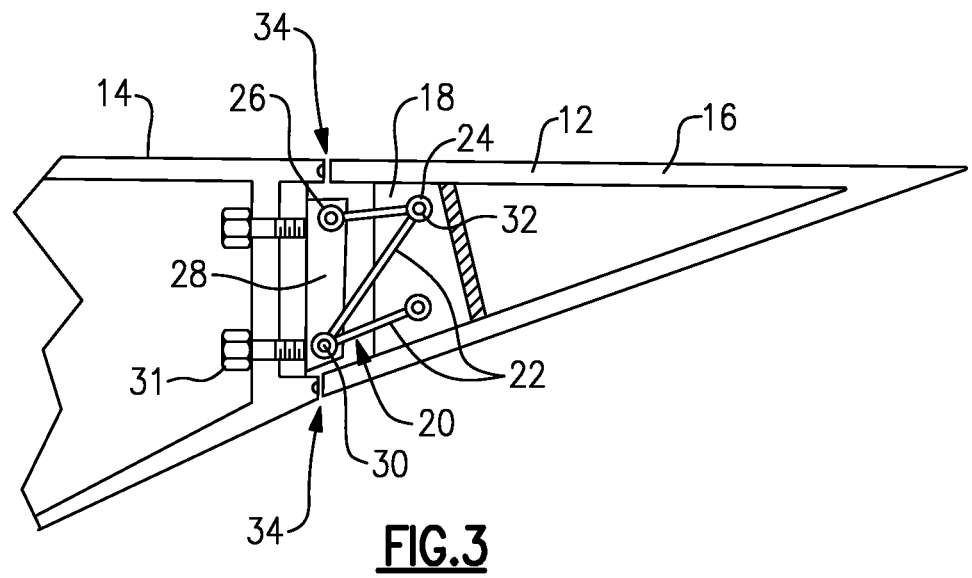
FIG. 3 is a section view at line 3-3 in FIG. 1 showing the trailing edge assembly in an assembled position.
Figure 4:
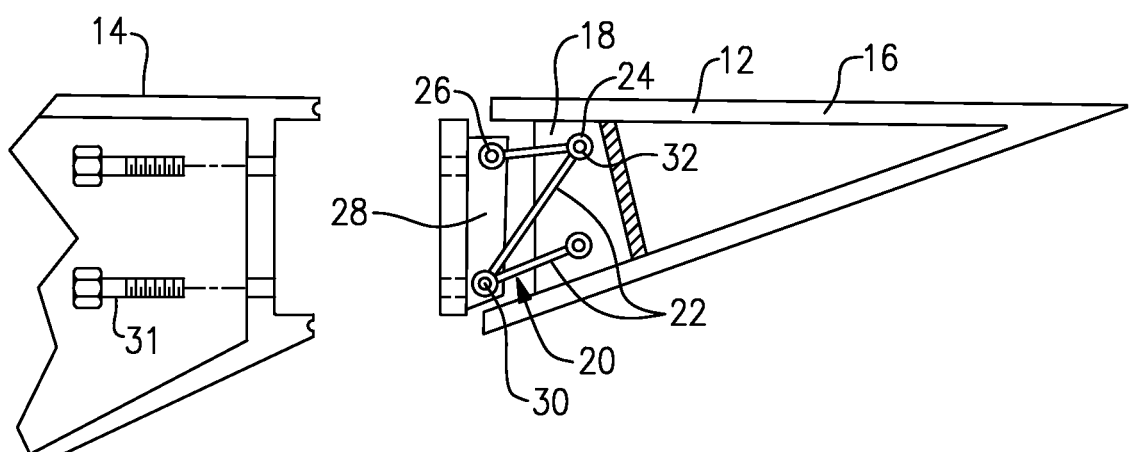
FIG. 4 is a section view at line 3-3 in FIG. 1 showing the trailing edge assembly in an unassembled position.
Figure 5:
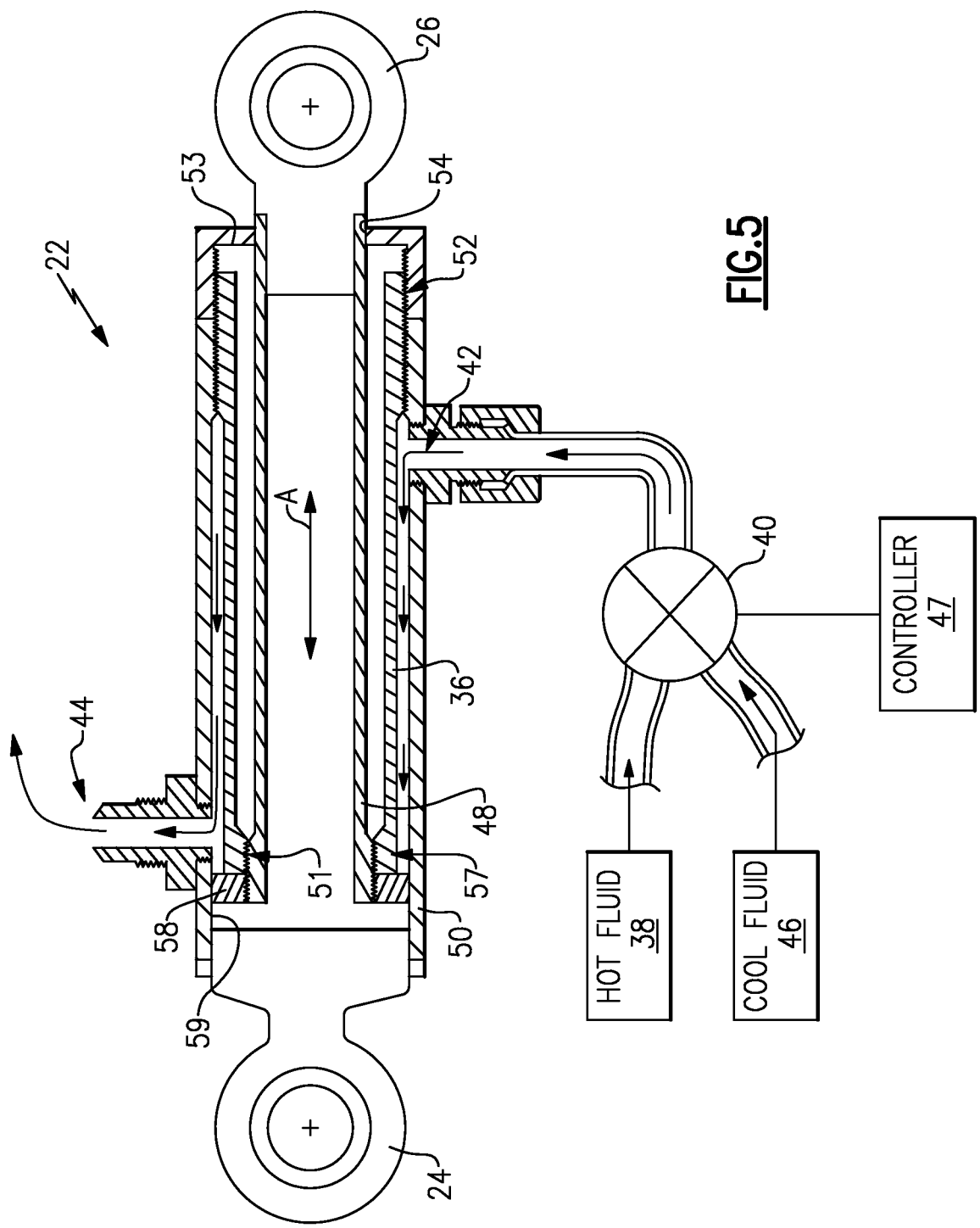
FIG. 5 is a section view of a linking member of the FIG. 2 mounting assembly.

Referring now to FIG. 5 with continuing reference to FIGS. 2-4, in this example, the adjustable linking members 22 each include a variable portion 36. The variable portion 36 is made of a material having a higher coefficient of thermal expansion than the first attachment portion 24 and the second attachment portion 26. In one example, the variable portion 36 is made of an aluminum or steel material, and the first attachment portion 24 and the second attachment portion 26 are both made of a graphite or titanium material. The materials need not be metallic.

Heating the variable portion 36 causes the variable portion 36 to expand, and particularly along the axis A. This expansion of the variable portion 36 moves the first attachment portion 24 away from the second portion 26 in a first direction along the axis A. Expanding the variable portion 36 increases the axial length of the adjustable linking member 22.

In this pneumatic example, a heating fluid, such as hot air, is used to heat the variable portion 36. The heating fluid is communicated from a hot fluid supply 38 through an adjustable valve 40 to a fluid communication path 42 radially outside the variable portion 36. The heating fluid is then vented from the adjustable linking member 22 at a vent location 44. The valve 40 controls the extension of the variable portion 36 by controlling the flow of heating fluid to the fluid communication path 42 to heat the variable portion 36.

In this example, the valve 40 is moveable to a position that communicates a cooling fluid from a cold fluid supply 46 into the fluid communication path 42. Cooling the variable portion 36 causes the variable portion 36 to retract in a second direction opposite the first direction. Retracting the variable portion 36 decreases the axial length of the linking member 22.

In one example, the hot fluid supply 38 is air that has been heated by a turbomachine of the aircraft 10, and the cold fluid supply 46 is ambient air such as bleed air. Other examples may use fluids other than air, and other sources of heating and cooling.

As can be appreciated, the valve 40 may mix the heating fluid with the cooling fluid to adjust the temperature of the fluid entering the fluid communication path 42. A person having skill in this art and the benefit of this disclosure would understand how to design a suitable valve 40.

In some examples, the cooling fluid is not used. In these examples, the variable portion 36 is not actively cooled.

When the trailing edge assembly 12 and the airframe structure 14 are expanding at different rates due to an increase in temperature, an operator may initiate extension of the adjustable linking member 22 by increasing the flow of hot fluid from the hot fluid supply 38. A controller 47 may be used to initiate movement of the valve 40, for example. Extending the adjustable linking member 22 increases the distance between the trailing edge assembly 12 and the airframe structure 14 to prevent damage to the trailing edge assembly 12 due to contact with the airframe structure 14 as the trailing edge assembly 12 grows relative to the airframe structure 14.

In this example, the adjustable linking member 22 includes an inner tube 48 and an outer tube 50. The variable portion 36 connects the inner tube 48 to the outer tube 50. One end of the inner tube 48 is threadably connected to the variable portion 36 at a position 51, and another end of the inner tube 48 is connected to the second attachment portion 26. Also, one end of the outer tube 50 is threadably connected to the variable portion 36 at a position 52, and another end of the outer tube 50 is connected to the first attachment portion 24. The linking member 22 has a higher coefficient of thermal expansion than both the inner tube 48 and the outer tube 50.

As can be appreciated, axial extension of the variable portion 36 causes the first attachment portion 24 and the second attachment portion 26 to move axially away from each other. Also, axial retraction of the variable portion 36 causes the first attachment portion 24 and the second attachment portion 26 to move axially toward each other.

In this example, the first attachment portion 24 is directly secured to the outer tube 50 via an interference fit. That is, the first attachment portion 24 includes a radially oversized area relative to the outer tube 50 that is received within the outer tube 50. The oversized areas cause the outer tube 50 to hold the first attachment portion 24 within the outer tube 50. The second attachment portion 26 is received within the inner tube 48 and held relative to the inner tube 48 via an interference fit. In other examples, the first attachment portion 24 and the second attachment portion 26 are secured using other techniques.

In this example, the variable portion 36 is also threadably attached to a base 53. The base 53 establishes an aperture 54 that receives a portion of the inner tube 48 and the second attachment portion 26. A collet nut (not shown) may be used to secure the inner tube 48 and the second attachment portion 26 within the aperture 54.

The inner tube 48 is also threadably secured to a spacer 58 that helps radially centers the inner tube 48 within the outer tube 50 during extension and retraction of the variable portion 36. The spacer 58 slides within the outer tube 50 along an inner wall 59 of the outer tube 50.

Figure 6:
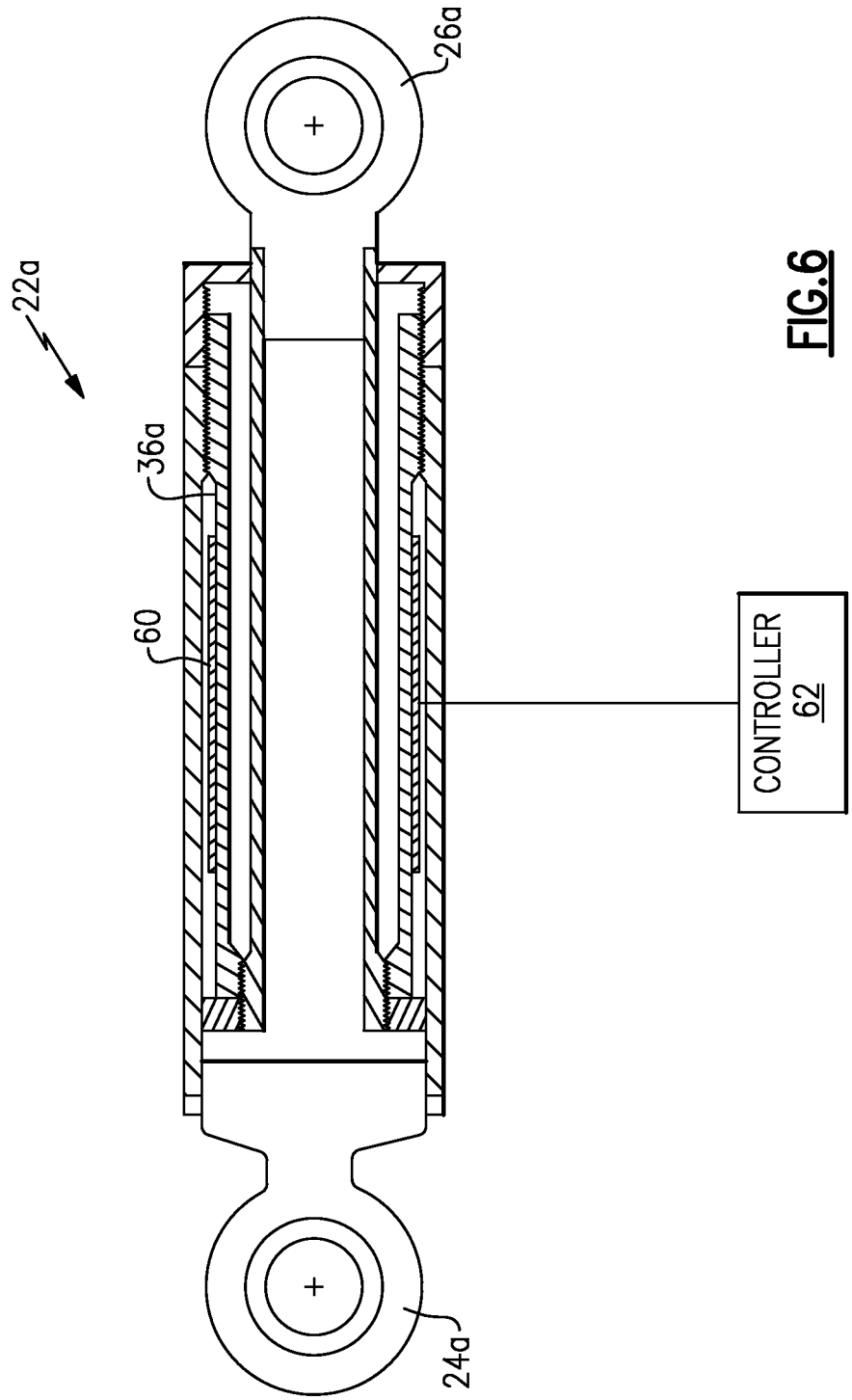
FIG. 6 is a section view of another example linking member suitable for use in the FIG. 2 mounting assembly.

Referring to another example linking member 22a of FIG. 6, includes a variable portion 36a that is heated using a technique other than moving a heated fluid near the variable portion 36a. In this example, the variable portion 36a is heated with a heat tape 60 that is wrapped about areas of the variable portion 36a. To extend a first attachment portion 24a relative to the second attachment portion 26a, a controller 62 sends a current through the heat tape 60, which introduces thermal energy to the variable portion 36a to extend the variable portion 36a. Retracting the linking member 22a would take place when current to the heat tape 60 is blocked and the variable portion 36a is allowed to cool by ambient air or bleed air.

A person having skill in the art and the benefit of this disclosure may understand still other techniques to heat and cool the variable portions 36 and 36a of the disclosed examples.

Although described as securing components having different coefficients of thermal expansion. The example adjustable linking members 22 and 22a may be used to secure components having the same coefficient of thermal expansion.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An adjustable linking member of a mounting assembly, comprising:
   a first attachment portion configured to connect a linking member to a first component;
   a second attachment portion configured to connect the linking member to a second component;
   a variable portion coupling the first attachment portion and the second attachment portion that varies a distance between the first attachment portion and the second attachment portion in a first direction when heated, and varies the distance between the first attachment portion and the second attachment portion in a second direction when cooled, the first direction opposite the second direction; and
   a valve configured to selectively permit communication of a fluid to a position near the variable portion to vary the distance, wherein the valve selectively permits communication of a fluid at a first temperature to the position to vary the distance in the first direction, and further selectively permits communication of a fluid at a second temperature to the position to vary the distance in a second direction, the first temperature being greater than the second temperature.

2. The adjustable linking member of claim 1, including a heating element secured near the variable portion, the heating element configured to selectively heat the variable portion in response to a controller command.

3. The adjustable linking member of claim 2, wherein the heating element comprises heating tape.

4. The adjustable linking member of claim 1, wherein the fluid at the first temperature comprises air heated by a turbomachine.

5. The adjustable linking member of claim 1, wherein the fluid at the second temperature comprises bleed air from a turbomachine.

6. The adjustable linking member of claim 1, including a radially outer tube receiving a radially inner tube, the radially outer tube connected to both the variable portion and the first attachment portion, and the radially inner tube connected to both the variable portion and the second attachment portion, the variable portion being a component that is separate and distinct from both the radially outer tube and the radially inner tube.

7. The adjustable linking member of claim 6, including a valve configured to selectively permit communication of a fluid to a position radially between the outer tube and the variable portion to vary the distance.

8. The adjustable linking member of claim 7, wherein the variable portion is configured to move the radially inner tube relative to the radially outer tube in response to the fluid.

9. The adjustable linking member of claim 7, wherein the fluid heats the expandable portion relative to an ambient temperature of air surrounding the radially outer tube.

10. The adjustable linking member of claim 7, wherein the fluid cools the expandable portion relative to an ambient temperature of fluid external to the radially outer tube and adjacent to the radially outer tube.

11. The adjustable linking member of claim 1, wherein the variable portion has a higher coefficient of thermal expansion than both the first attachment portion and the second attachment portion.

12. The adjustable linking member of claim 1, wherein the first component has a coefficient of thermal expansion that is different than the coefficient of thermal expansion of the second component.

13. The adjustable linking member of claim 1, wherein the first component is a ceramic matrix composite component, and the second component has a higher coefficient of thermal expansion than the first component.

14. The adjustable linking member of claim 1, wherein the first component or the second component is trailing edge assembly of the aircraft, and the other of the first component or the second component is a metal airframe structure of the aircraft.

15. An adjustable mounting assembly linking member, comprising:
a linking member having a first end secured to a first component of an aircraft, second end secured to a second component of the aircraft,
the first component having a first coefficient of thermal expansion,
the second component having a second coefficient of thermal expansion different than the first coefficient of thermal expansion;
a variable portion of the linking member, the variable portion configured to vary a length of the linking member in a first direction when heated, and to vary the length of the linking member in a second direction when cooled, the first direction opposite the second direction the length of the variable portion varied by a fluid selectively communicated to the adjustable mounting assembly; and
a valve configured to selectively permit communication of the fluid to a position near the variable portion to vary the distance, wherein the valve selectively permits communication of the fluid at a first temperature to vary the distance in the first direction, and further selectively permits communication of the fluid at a second temperature to vary the distance in the second direction, the first temperature being greater than the second temperature.

16. The adjustable mounting assembly linking member of claim 15, wherein the first component is a ceramic matrix composite component, and the second component has a higher coefficient of thermal expansion than the first component.

17. The adjustable mounting assembly linking member of claim 15, wherein linking member extends along an axis and the length is an axial length of the linking member.

18. The adjustable mounting assembly linking member of claim 15, wherein the first component or the second component is trailing edge assembly of the aircraft, and the other of the first component or the second component is a metal airframe structure of the aircraft.

19. The adjustable mounting assembly linking member of claim 15, wherein the length of the variable portion is increased in response to the fluid being heated relative to an ambient temperature of a surrounding environment.

20. The adjustable mounting assembly linking member of claim 15, wherein the length of the variable portion is decreased in response to the fluid being cooler than an environment surrounding the linking member.

* * * * *